(12) United States Patent
Jones

(10) Patent No.: US 8,266,971 B1
(45) Date of Patent: Sep. 18, 2012

(54) SURFACE FORCE DISTRIBUTION SENSOR BY FREQUENCY-DOMAIN MULTIPLEXING

(75) Inventor: Randall E. Jones, Seattle, WA (US)

(73) Assignee: Randall Jones, Seattle, WA (US)

( * ) Notice: Subject to any disclaimer, the term of this patent is extended or adjusted under 35 U.S.C. 154(b) by 215 days.

(21) Appl. No.: 12/592,456

(22) Filed: Nov. 24, 2009

Related U.S. Application Data

(60) Provisional application No. 61/200,300, filed on Nov. 25, 2008.

(51) Int. Cl.
*G01D 7/00* (2006.01)

(52) U.S. Cl. .................................................. 73/862.046

(58) Field of Classification Search ................... 73/862.041–862.046
See application file for complete search history.

(56) References Cited

U.S. PATENT DOCUMENTS

| | | | |
|---|---|---|---|
| 3,565,195 A * | 2/1971 | Miller et al. ............... | 177/210 R |
| 4,389,512 A | 6/1983 | Friedli et al. | |
| 4,526,043 A | 7/1985 | Boie et al. | |
| 4,644,801 A | 2/1987 | Kustanovich | |
| 4,827,763 A | 5/1989 | Bourland et al. | |
| 4,836,033 A * | 6/1989 | Seitz ....................... | 73/862.046 |
| 5,010,772 A * | 4/1991 | Bourland et al. ........ | 73/862.046 |
| 6,498,590 B1 | 12/2002 | Dietz et al. | |
| 6,703,552 B2 | 3/2004 | Haken | |
| 6,826,968 B2 | 12/2004 | Manaresi et al. | |
| 6,862,942 B2 | 3/2005 | Kawahata | |
| 7,217,891 B2 * | 5/2007 | Fischer et al. ................ | 177/144 |
| 7,948,477 B2 * | 5/2011 | Hotelling ....................... | 345/173 |
| 2008/0127739 A1 | 6/2008 | DeAngelis et al. | |
| 2009/0255737 A1 * | 10/2009 | Chang et al. ............... | 178/18.06 |

OTHER PUBLICATIONS

Jones, Handall E., "Intimate Control for Physical Modeling Synthesis", University of Victoria Masters' Thesis, Aug. 2009, pp. 33-67.

* cited by examiner

*Primary Examiner* — Lisa Caputo
*Assistant Examiner* — Octavia Davis-Hollington

(57) ABSTRACT

One embodiment of a surface force distribution sensor includes an elastic dielectric (108) sandwiched by a first plurality of compliant, conductive carrier elements (110) and a second plurality of conductive pickup elements (106), as well as a system for frequency-domain demultiplexing including at least a microprocessor (209). A plurality of signals is generated, each of which has a different fundamental frequency and is connected to a different carrier element. The pickup and carrier elements are arranged so that each pickup element overlaps one or more carrier elements. When forces are applied to a nonconductive compliant layer (112), the distance between one or more carrier elements and one or more pickup elements decreases at their points of overlap, increasing the amplitude of carrier signals capacitively transmitted to the pickup elements. The microprocessor demultiplexes the signals received from the pickup elements to determine the amplitude of each carrier signal received, and thereby the applied force, at each point of overlap on the surface of the compliant layer. Other embodiments are described and shown.

9 Claims, 6 Drawing Sheets

SURFACE FORCE DISTRIBUTION SENSOR BY FREQUENCY-DOMAIN MULTIPLEXING

CROSS-REFERENCE TO RELATED APPLICATIONS

This application claims the benefit of provisional patent application No. U.S. 61/200,300, filed 25 Nov. 2008 by the present inventor.

FEDERALLY SPONSORED RESEARCH

None.

SEQUENCE LISTING

None.

1 FIELD OF THE INVENTION

This application relates to sensor apparatus and, more specifically, to sensors that measure the spatial distribution of forces applied to a surface.

2 BACKGROUND

In human computer interface, as well as robotic control and other fields, it is often desirable to make sensors that measure the distribution of forces applied to a surface of an object by physical contact with other objects. In robotics applications, these measurements may allow a manipulator with a sensing surface to be adjusted so that the objects are handled properly. When the objects are human fingers, a force sensor can be used as an interface, allowing a person to control computer software such as music applications.

In a musical application, trained musicians are able to control sounds by using gestures that are extremely rapid, accurately placed, and may range in pressure from very light to very heavy. Accordingly, a sensor used to control sound in musical applications should sense a wide range of forces, have a high temporal resolution, and have high positional accuracy. Such a sensor should ideally also be portable, rugged and inexpensive to manufacture.

A mechanical approach to a musical sensor is taught by U.S. Pat. No. 6,703,552 B2 issued to Haken. Haken's Continuous Music Keyboard comprises a plurality of rods, each of which has a magnet on each end. Pressing on a control surface displaces the rods and allows surface force displacement to be measured. Although this device has high temporal resolution and positional accuracy, its sensing method allows only one force at any given horizontal position to be recognized. In addition, this mechanical approach to sensing results in a device that is relatively heavy and expensive to produce.

It is well known that the capacitance between a pair of parallel plate conductors varies inversely as the distance between the conductors. This principle has been used to construct a variety of capacitive sensors. Capacitive force sensors can be made using conductive layers separated by an elastic dielectric. When forces are applied to these sensors, the distance between the conductive layers changes. This distance can be determined by measuring the change in capacitance. Using multiple capacitive elements, sensors can be made that determine the distribution of forces on a surface.

For example, U.S. Pat. No. 4,526,043 issued to Boie et al. discloses a force sensor including an elastic dielectric, a first plurality of conductive elements on one side of the dielectric and a second plurality of conductive elements on the opposite side of the dielectric. At each point where the conductive elements overlap, the capacitance between the two elements can be measured to determine the distance between them, and thereby the force applied to the sensor's surface. When a measurement is to be taken of the spacing between the elements at a given point, a voltage signal is routed to a first element using an analog multiplexer, and a signal from an overlapping second element is routed to a phase-sensitive detector circuit using a second analog multiplexer. These multiplexers make connections between a given circuit element and one from a group of other elements, one such connection at a time. This widely used technique is known as time-division multiplexing.

U.S. Pat. No. 4,827,763 issued to Bourland et al. discloses a pressure distribution measuring system including a pad of insulating material with a central array of linear electrodes, aligned perpendicular to two outer linear electrode arrays. This system also incorporates a time-division multiplexing circuit to attach a measuring apparatus sequentially to each of multiple sensing elements.

U.S. Patent Application No. US 2008/0127739 A1 of DeAngelis et al. describes a flexible capacitive sensor with a resilient dielectric. One embodiment of this invention teaches the use of multiple capacitive elements to determine the position of a force, again only by the use of time-division multiplexing.

Further patents in the field of capacitive sensing, including U.S. Pat. No. 4,644,801 issued to Kustanovich, U.S. Pat. No. 6,862,942 B2 assigned to Kawahata, U.S. Pat. No. 6,826,968 assigned to Manaresi et al., and U.S. Pat. No. 4,389,512 assigned to Speck, all teach the use of a time-division multiplexing circuit as the only method of switching between sensing elements.

Though time-division multiplexing is the most widely-used technique to connect multi-element sensors to signal generation and signal processing elements, it suffers from a number of disadvantages:

(a) Measurements taken by different elements are not simultaneous. Because only one element of a multiplexed group of elements can be measured at any given time, errors can occur in the relative timing of force measurements from different elements. In particular, two forces simultaneously applied at different locations may be mischaracterized as having occurred at different times. In a musical application, these temporal errors may be perceptible and thereby have a negative impact on playability. In a robotics application, they may limit the temporal precision of control.

(b) Measurements are not continuous. Transient forces of short duration may go entirely undetected if applied to a particular element while other elements are being measured.

These disadvantages of time-division multiplexing can be minimized by increasing the switching rate of the multiplexing. However, increasing the switching rate also necessarily decreases the time intervals during which each element can be measured. As the rate increases, more sensitive and thereby more expensive detection circuitry is required.

U.S. Pat. No. 6,498,590 issued to Dietz et al. teaches the use of a code-division multiplexing scheme to distinguish between antennas in a multi-user capacitive touch sensing system. This approach is one solution to the problem of making detectors that work at higher switching rates. In this system, a plurality of carrier elements is driven by a digital pseudo-random noise sequence generated using a polynomial function passed through a shift register to provide time delays. This patent also briefly mentions the possibility of frequency-division multiplexing, an approach in which multiple sensing elements are uniquely identified with different carrier frequencies, but dismisses this approach as being relatively expensive.

3 SUMMARY

Accordingly, it is a general object of the invention to provide a system that is capable of measuring the spatial distribution of forces applied to a surface. A more specific object along these lines is to provide a system that can measure the distribution of forces continuously and simultaneously. A further specific object of the invention is to provide a system that can measure rapid fluctuations in the distribution of forces. It is also desired to provide a system that can be built at low cost, and to be portable and rugged in construction.

The present invention meets these and other objects by implementing a surface force distribution sensor using frequency-domain demultiplexing. In one embodiment of this invention a single microprocessor can be used to generate a plurality of carrier frequencies and to analyze received mixtures of these frequencies by which multiple forces can be measured. This eliminates the multiplexing and demultiplexing components required in designs previously disclosed in the art, allowing lower-cost manufacturing. Frequency-domain demultiplexing has the additional benefit of allowing truly continuous measurements of force.

In accordance with one embodiment, a surface force distribution sensor includes an elastic dielectric layer sandwiched between one plurality of separated conductive carrier elements and another plurality of separated conductive pickup elements. A plurality of carrier signals at differing frequencies, generated by a microprocessor for example, is connected pairwise to each of the carrier elements. The signals thereby induced in the plurality of pickup elements are then analyzed by the microprocessor.

When forces are applied to the surface of the sensor, the elastic dielectric layer is compressed, reducing the distance between the sandwiching carrier and pickup elements and thereby increasing the capacitive coupling between them. Through this coupling, a mixture of the carrier signals is transmitted to each pickup element. Software on the microprocessor performs demultiplexing of the received signals in the frequency domain, allowing simultaneous measurement of the strength of each received carrier signal, and thereby the applied force at each point on the surface.

4 DESCRIPTION OF THE DRAWINGS

5 REFERENCE NUMERALS

| 100 | electromechanical portion |
| --- | --- |
| 102 | ground layer |
| 104 | spacer |
| 106 | pickup elements |
| 108 | elastic dielectric |
| 110 | carrier elements |
| 112 | nonconductive compliant layer |
| 114 | rim |
| 116 | flat panel display |
| 201 | amplifiers |
| 203 | capacitors |
| 205 | A/D converters |
| 207 | signal generator |
| 209 | microprocessor |
| 211 | computer interface |
| 211 | computer interface |
| 213 | multiplexer |
| 215 | internal A/D converter |
| 301 | pickup signal receiver |
| 305 | FFT calculator |
| 310 | amplitude calculator |
| 315 | displacement calculator |
| 320 | force calculator |

6 DETAILED DESCRIPTION OF THE FIRST EMBODIMENT

Figure 1:
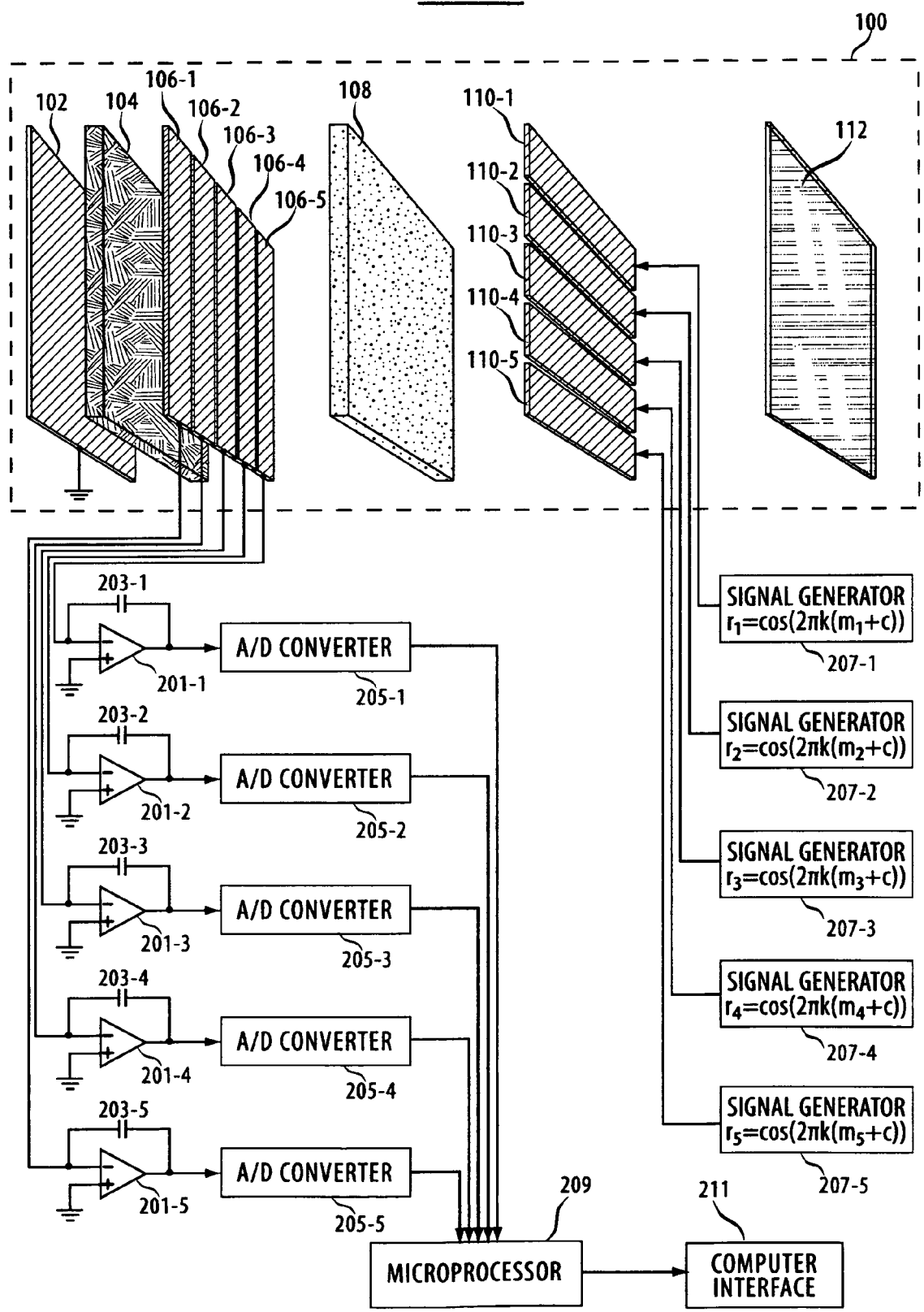
FIG. 1 shows a force sensor arrangement illustrative of a preferred embodiment of the invention.
Figure 2:
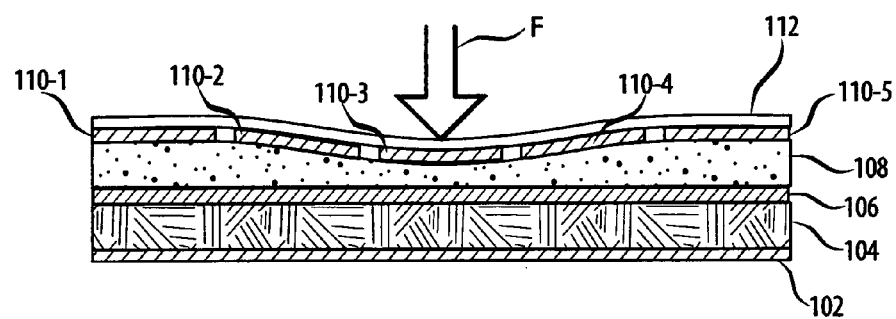
FIG. 2 is a cross-sectional view of the sensor.

One embodiment of the sensor is illustrated in FIG. 1 (expanded view) and in FIG. 2 (cross section). In the following description, particular reference is made to the use of the sensor in a musical controller application. It will be appreciated, however, that the practical applications of the sensor extend to other areas in which continuous measurement of surface force distribution is useful.

Referring to FIG. 1, the sensor comprises nonconductive compliant layer 112 on one surface of which compliant carrier layer elements 110-1 through 110-5 are arranged in parallel, elastic dielectric layer 108, conductive pickup elements 106-1 through 106-5 arranged orthogonally to conductive carrier layer elements 110-1 through 110-5, a spacer 104, and a ground layer 102.

Carrier and pickup elements are shown to be uniform and parallel in FIG. 1. While this arrangement is typical and is the simplest in concept, the elements need not be strictly uniform or parallel, but they must be electrically isolated from one another, and each pickup element must overlap one or more carrier elements.

In a musical instrument application, the surface of layer 112 may present an area large enough to offer control by one or more hands, 40 by 20 cm for example. Nonconductive, compliant layer 112 may comprise a wood, plastic or another material having flexibility, durability and tactile properties suitable for contact with the fingertips. The elastic dielectric layer 108 and conductive layers 106 and 110 are adapted to return to their uncompressed positions when an applied force is removed. The two conductive layers 106 and 110 are separated by elastic dielectric layer 108. In one embodiment the elastic dielectric may be a resilient, compressible open-cell or closed-cell foam material. Some materials for the elastic dielectric include, but are not limited to, polyurethane foam, silicone, natural rubber. The dielectric should preferably exhibit a low point spread characteristic so that compression at a crossing of the two layers of conductive elements does not significantly affect the separation at other crossings. The thickness of the dielectric may be on the order of 1 to 10 mm for a musical application.

Each carrier element 110-1 through 110-5 is connected to an electrical signal generator 207-1 through 207-5. Each signal generator outputs a different frequency of oscillation, preferably in the form of a sinusoidal signal. Each pickup element 106-1 through 106-5 is connected to an amplifier 201-1 through 201-5. Feedback capacitors 203-1 through 203-5 are connected between the positive inputs and outputs of these amplifiers to form capacitance-measuring circuits. The output of each amplifier is connected to an analog to digital (A/D) converter 205. The output of each A/D converter is connected to a microprocessor 209. Software on the microprocessor calculates a matrix of values that represents the spacing between the carrier and pickup elements at each crossing. This matrix is communicated via a computer interface 211 to a sound-generating device or any other external device. The computer interface may implement any standard hardware and software protocols for data communication, including but not limited to USB, IEEE-1394 or TCP/IP.

6.1 Operation

FIG. 2 is a cross-sectional view of the electromechanical portion 100 of the surface force distribution sensor in an enlarged form. A force F applied orthogonally to nonconductive compliant layer 112 causes layers 112, 110 and 108 to deform such that the distance between orthogonal conductive elements 106 and 110 at each crossing varies as a function of the force applied to the crossing. This change in distance affects the capacitance between the carrier and pickup elements at the crossing, which in turn changes the amplitudes of signals transmitted from the carrier elements to the pickup elements. Signal voltage is transmitted across each junction in inverse proportion to the distance between the elements. The amplitudes of these voltages, therefore, encode all the information needed to determine the distances between elements and thereby the applied forces. Multiplying each amplitude by a different frequency, that of the carrier signal, allows all of this distance information for a pickup element to be encoded by a single physical signal. This technique is well-known in fields including telecommunications and is called frequency-domain multiplexing. Demultiplexing a pickup signal in the frequency domain allows the distance from a pickup element to each carrier element to be decoded continuously.

Figure 3:
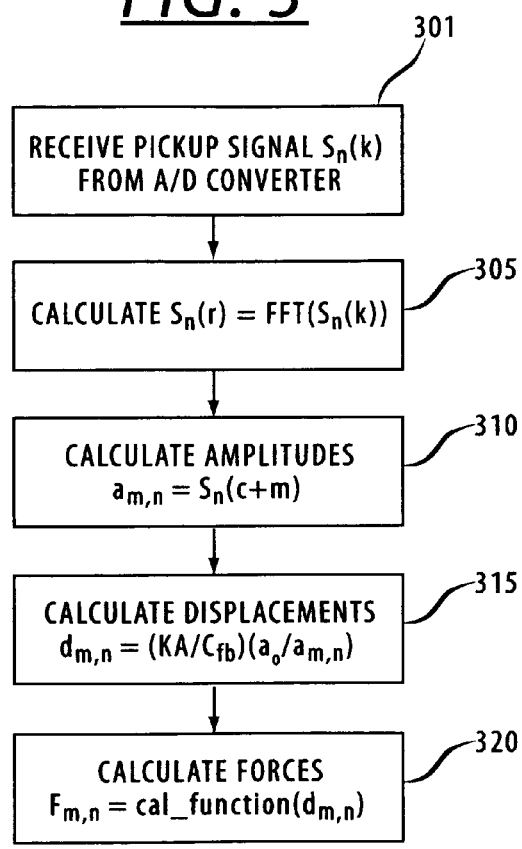
FIG. 3 is a flow chart of digital signal processing software for frequency-domain demultiplexing of sensor data.

For each pickup element, a capacitance-measuring circuit formed by amplifier 201 and feedback capacitor 203, as shown in FIG. 1, provides a varying voltage to an A/D converter 205. Digital data from the converter is read by microprocessor 209. As shown in FIG. 3, software on the microprocessor analyses the digitized signals to determine the distribution of forces on the sensor surface. For each pickup, calculation of the forces proceeds as follows. Column signal receiver 301 reads N samples from A/D converter 205-$n$, where N is a signal buffer size in samples, typically 32, and n is the pickup number. Each signal generator 207-1 through 207-5 outputs a sinusoid with frequency $sr/N(m+c)$, where sr is the system's sampling rate in Hz, N is the signal buffer size, m is the carrier number, and C is an integer frequency offset of the first carrier signal generator 207-1. Typical values for sr and N are sr=44, 100 and N=32. This particular combination leads to all carrier signals being multiples of 1,378.125 Hz.

It can be shown mathematically that these frequencies relative to the signal buffer size are ideal choices for the carriers. In each pickup the sum of all the received carrier signals, $S_n(k)$, is equal to $$S_n(k) = \sum_{m=1}^{5} a_{m,n} \cos\left(2\pi \frac{k}{N}(m+c)\right) \quad (1)$$

$$= \sum_{m=1}^{5} a_{m,n} \frac{1}{2}\left(e^{2\pi j \frac{k}{N}(m+c)} + e^{-2\pi j \frac{k}{N}(m+c)}\right)$$

FFT (Fast Fourier Transform) calculator 305 transforms the input samples from the time domain representation $S_n(k)$ into a frequency domain representation $S_n(r)$, which can be written $$S_n(r) = \frac{1}{2} \sum_{k=-N/2}^{N/2} \sum_{m=1}^{5} a_{m,n}\left(e^{2\pi j \frac{k}{N}(m+c)} + e^{-2\pi j \frac{k}{N}(m+c)}\right) e^{-2\pi j \frac{k}{N} r}. \quad (2)$$

Recalling that $$\sum_{k=0}^{N-1} e^{2\pi j \frac{k}{N} a} e^{2\pi j \frac{k}{N} b} = \delta[a-b]$$

where $$\delta[n] = \begin{cases} 1 & \text{for } n = 0, \\ 0 & \text{otherwise.} \end{cases}$$

Allows the frequency domain representation $S_n(r)$ to be written $$S_n(r) = \frac{1}{2} \sum_{m=1}^{5} a_{m,n}(\delta[m+c-r] + \delta[-m-c-r]) \quad (3)$$

$$= a_{r-c,n}.$$

In other words, each pickup signal, when transformed into the frequency domain, consists of a list of the amplitudes of each carrier signal received at that pickup element. The calculation above shows that when the carrier frequencies are chosen correctly, the resulting amplitude measurements are continuous and no distortion is introduced from truncating the time-domain signals. This conclusion can also be reached by the more qualitative observation that because each of the carriers repeats an integral number of times in a signal vector, it has equal slope and instantaneous amplitude at both ends of the vector and thus no distortion is caused. Amplitude calculator 310 transforms the frequency data from the complex into the real domain and subtracts the carrier offset C to obtain the real amplitude of the signal received at each crossing $a_{m,n}$.

The amplitude of the carrier and the electrode displacement at each crossing are related by the equation $$d_{m,n} = (KA/C_{fb})(a_0/a_{m,n}),$$

where K is the dielectric constant of layer 108, A is the area of overlap of the carrier and pickup elements, $C_{fb}$ is the capacitance of feedback capacitor 203, $a_0$ is the scaled amplitude of the junction when the pickups and carriers are at their rest positions, and $a_{m,n}$ is the real amplitude of the carrier as above. Displacement calculator 315 obtains the displacement at each junction $d_{m,n}$ from this equation. In one embodiment the rest amplitude $a_0$ may be dynamically calibrated to compensate for change due to mechanical hysteresis.

The relationship between displacement and applied force at each junction is a complex nonlinear function that depends on the materials and construction of layers 112, 110 and 108. For each pickup element, force calculator 320 calculates the applied force from the displacement using a calibration function. This function may be derived from theory or from measurements of the displacement of the device with respect to known applied forces.

6.2 Alternative Embodiments

Figure 4:
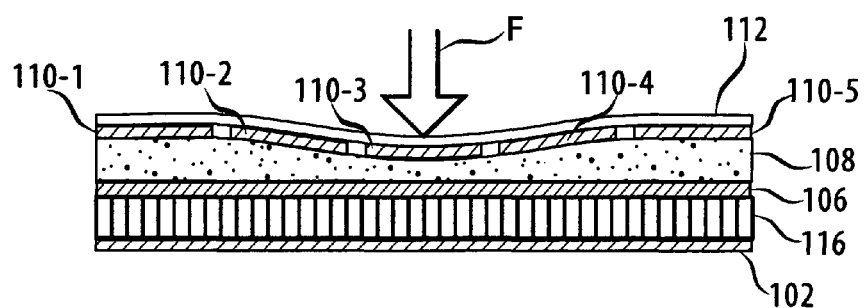
FIG. 4 shows one embodiment of the sensor incorporating a graphical display device.

The surface force distribution sensor may incorporate a display device. As shown in FIG. 4, carrier elements 110-1 through 110-5 and pickup elements 106 made of a transparent conductive material, such as indium tin oxide, are formed on a transparent elastic dielectric formed of, for example, clear silicone rubber. A transparent, compliant nonconductive layer 112 is positioned above the carrier elements. A flat-panel graphics display 116 is positioned directly under the pickup elements. A ground layer 102 is positioned under the display. Thus, a display device having a surface force measurement function is realized. This display device may be applied to, for example, a self-contained instrument for computer music.

Figure 5:
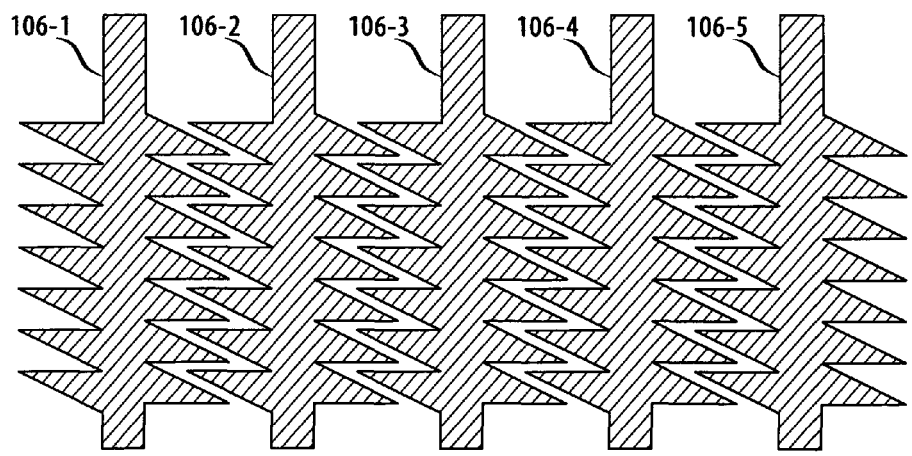
FIG. 5 shows one embodiment of the sensor where the conductive elements have interlocking triangular teeth.

FIG. 5 shows an alternative geometry of pickup elements 106-1 through 106-5. In this embodiment the pickup elements have tapered teeth that interlock with neighboring elements, so that the amplitude transition is continuous as a force is moved across the elements. Either the carrier and pickup elements, or both, may be modified in this way.

Figure 6:
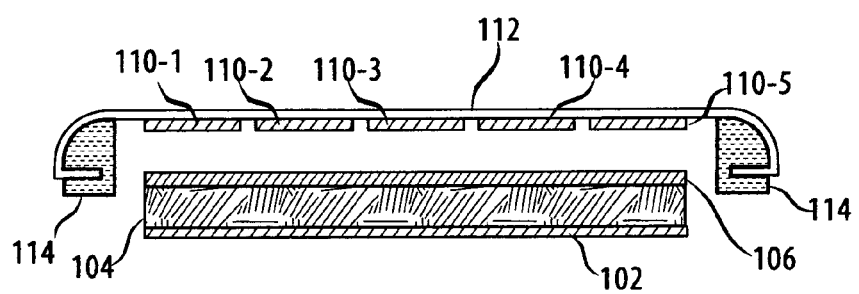
FIG. 6 shows one embodiment of the sensor where the surface is a membrane held in tension by a solid rim.

A variety of physical configurations of the sensors are possible. FIG. 6 shows a cross-sectional view of an alternative embodiment in which compliant, nonconductive layer 112 is supported like a drum head, by a rigid rim 114. In this embodiment, layer 112 may be a flexible plastic material such as a polyethylene film. Row elements 110 are bonded to the underside of layer 112. In this embodiment, air is the dielectric material between the carrier and pickup elements, therefore the equations by which the forces are calculated need to be adjusted accordingly.

Figure 7:
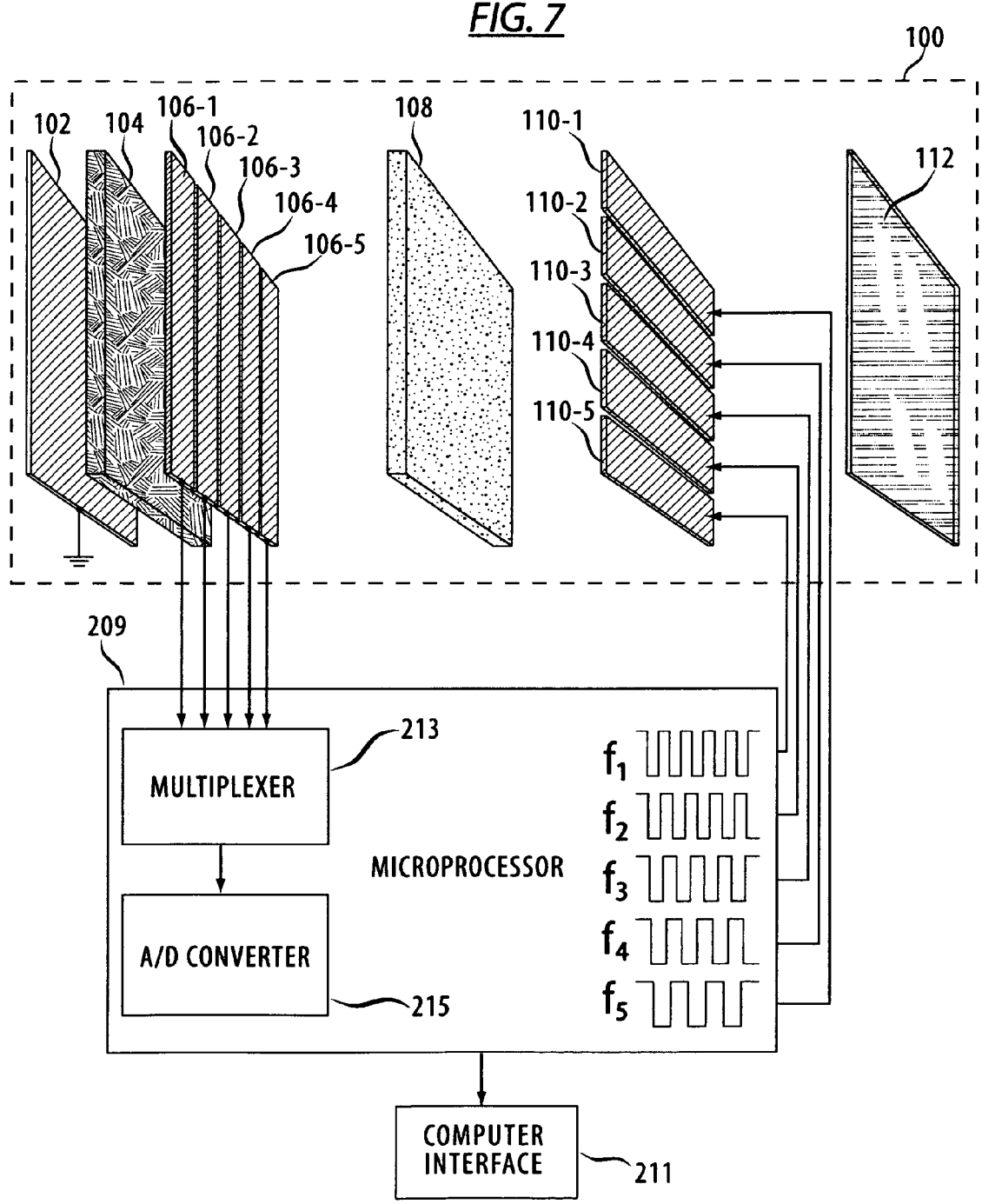
FIG. 7 shows one embodiment of the sensor incorporating microprocessor with an onboard analog to digital converter.

Another embodiment of the sensor is shown in FIG. 7. This embodiment uses a microprocessor 209 incorporating one or more onboard A/D converters 112. One such microprocessor is the TMS320LF2407A made by Texas Instruments. This particular chip uses a time-domain multiplexer 213 to implement multiple channels of conversion using a single converter. Software on the microprocessor is still responsible for frequency-domain demultiplexing of the individual pickup signals as in the embodiment shown in FIG. 1, however. In the embodiment shown in FIG. 7 the microprocessor is able to both demultiplex the signals from pickup elements 106-1 through 106-5 and generate signals sent to carrier elements 110-1 through 110-5. By using square wave signals as shown, the digital outputs of the microprocessor can be used to drive the carrier elements directly. When square wave carriers are used, their frequencies must be chosen so that neither the fundamental frequency nor any of its odd harmonics are equal to the fundamental frequency of another carrier. This requirement can be satisfied by keeping all of the fundamental frequencies within the range $f_0$ to $3f_0$. Note that the amplifiers 201-1 through 201-5 shown in FIG. 1 are eliminated entirely. Though this reduces the signal to noise ratio of the received signals, the resulting sensor is still functional as long as there is significant correlation between applied force and the changes in received signals. Thus, this embodiment can be seen as one extreme of the possibilities created through the use of frequency-domain multiplexing, and a design capable of manufacture at particularly low cost.

6.3 Advantages

From the description above, a number of advantages of some embodiments of the sensor embodiments described are evident:

(a) Forces on the sensor surface are detected continuously at each point. In a musical instrument application, this allows transient gestures of arbitrarily small duration to be measured consistently, an important feature for playability.

(b) Because all of the sensing elements are measured simultaneously, the relative timing of multiple forces can be measured precisely.

(c) Frequency-domain multiplexing omits the analog multiplexing and demultiplexing circuits of previous methods in favor of digital signal processing. Since a microprocessor is likely to be an existing component of any product design in the field, my sensor design has the potential to be manufactured at lower cost than previous methods.

6.4 Conclusions, Ramifications and Scope

Thus, the reader will see that the sensors of the various embodiments can continuously and simultaneously sense a spatial distribution of forces applied to a surface, and are therefore more suitable than previously known sensors for applications including musical interface and robotic control. Continuous sensing by frequency-domain multiplexing allows the consistent measurement of transient forces of indefinitely small duration. In addition, the embodiments of the sensors described have the potential to be manufactured at very low cost.

While the above description contains many specificities, these should not be construed as limitations on the scope, but rather as examples of preferred embodiments. Many other variations are possible. For example, the sensing elements may be flexible allowing the surface to be formed around a sphere or other curved shape, an entire object may be covered with a sensing surface over its front, back and sides, or the sensing surface may be applied over a large area and used as a floor sensor. Accordingly, the scope should be determined not by the embodiments illustrated, but by the appended claims and their legal equivalents.

What is claimed is:

1. A force sensor comprising:
   a dielectric;
   a plurality of conductive carrier elements on one side of said dielectric;
   a plurality of conductive pickup elements on the opposite side of said dielectric;
   said pluralities of carrier and pickup elements being oriented to form a plurality of dielectric separated crossings;
   means for applying carrier signals to said carrier elements including means for generating a plurality of signals of predetermined frequencies; and
   a plurality of amplifiers each connected to one of the pickup elements for amplifying the carrier signals transmitted capacitively from multiple carrier elements to the respective pickup element at the crossings thereof; and
   frequency demultiplexing means connected to said plurality of amplifiers for separating the output of each respective amplifier into a plurality of component frequencies; and
   means for analyzing the amplitudes of each said component frequency to determine the distance between the carrier and pickup elements at one of the dielectric separated crossings; and means for restoring said pluralities of conductive elements to predetermined rest positions in the absence of external forces;

whereby external forces varying the positions of said pluralities of carrier and pickup elements at each of the crossings thereof from said rest positions may be determined simultaneously and continuously.

2. The force sensor of claim 1 wherein said means for applying signals incorporate a microprocessor.

3. The force sensor of claim 1 wherein said means for frequency demultiplexing signals incorporate a microprocessor.

4. The force sensor of claim 1 wherein said dielectric includes a compressible elastic material.

5. The force sensor of claim 1 wherein said plurality of signals have frequencies between 1 kilohertz and 100 kilohertz.

6. The force sensor of claim 1 further including a computer interface.

7. A method of measuring a distribution of forces, the method comprising:

providing an elastic dielectric sandwiched between a first plurality of conductive carrier elements and a second plurality of conductive pickup elements, said pluralities of conductive elements positioned to create areas of overlap with each other; and generating first signals of predetermined frequency and amplitude and transmitting the first signals to the first plurality of carrier elements; and receiving second signals from the second plurality of pickup elements; and frequency demultiplexing the second signals to determine distances separating the first plurality of carrier elements from the second plurality of pickup elements at the areas of overlap thereof, and thereby forces acting on the dielectric.

8. The method of claim 7, wherein demultiplexing the second signals comprises calculating a Fast Fourier Transform using a microprocessor.

9. The method of claim 7, wherein generating said first signals comprises executing a program on a microprocessor; and wherein demultiplexing said second signals comprises executing an additional program on the microprocessor.

* * * * *